Figure 1:
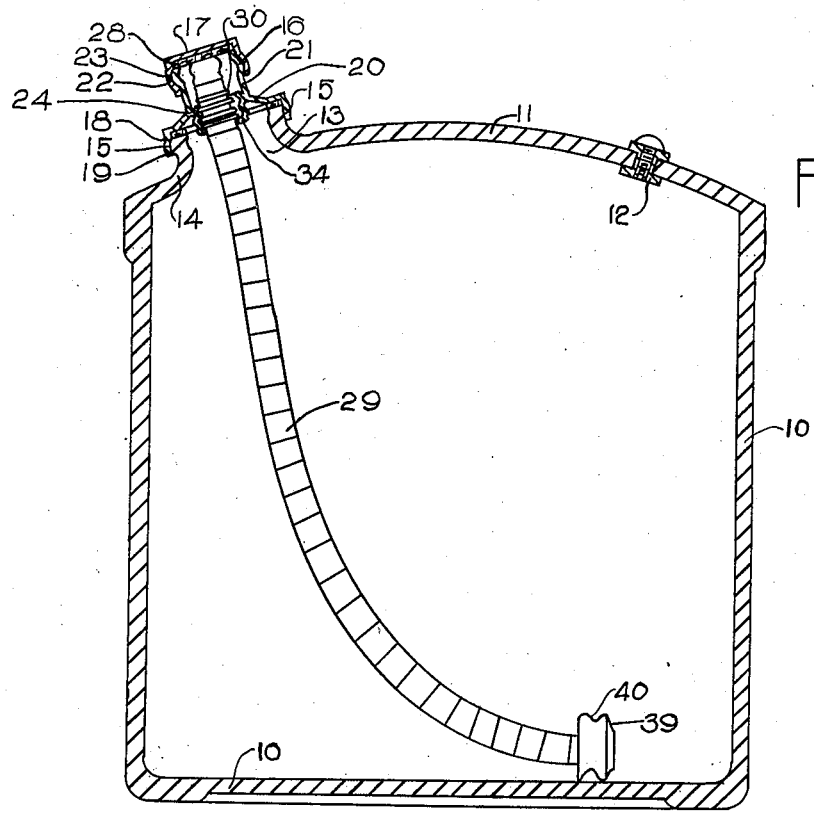

April 30, 1940.  H. A. DAMKROGER ET AL  2,198,933

CONTAINER FOR LIQUIDS

Filed May 31, 1939

INVENTORS
HAROLD A. DAMKROGER
JACOB F. NIGGELER
BY G. H. Braddock
ATTORNEY

Patented Apr. 30, 1940

2,198,933

UNITED STATES PATENT OFFICE 2,198,933

CONTAINER FOR LIQUIDS

Harold A. Damkroger, Minneapolis, and Jacob F. Niggeler, Robbinsdale, Minn., assignors to General Metalware Company, Minneapolis, Minn., a corporation of Delaware Application May 31, 1939, Serial No. 276,704

13 Claims. (Cl. 221—27)

This invention has relation to a container for liquids, such as gas, oil, and other liquids.

An object of the invention is to provide a container for receiving and dispensing liquids which will be of novel and improved construction.

A further object is to provide a container for receiving and dispensing liquids which will include a novel and improved pouring spout or nozzle.

A further object is to provide a container for receiving and dispensing liquids which will include a pouring spout or nozzle adapted to be assembled with said container in novel and improved manner.

A further object is to provide a container for receiving and dispensing liquids which will include a novel and improved construction and arrangement of pouring spout or nozzle for the container adapted to be assembled with said container in pouring relation thereto at the outer side of the container when to be put to use and to be situated within said container when out of use.

A further object is to provide a container for receiving and dispensing liquids which will include a novel and improved construction and arrangement adapted to provide a closure means for a filler opening of the container, as well as a retaining means for a pouring spout or nozzle of said container.

A further object is to provide a container for receiving and dispensing liquids which will include a novel and improved construction and arrangement adapted to provide a closure means for a filler opening of the container as well as a retaining means for a pouring spout or nozzle adapted to be assembled with said container in pouring relation thereto at the outer side of the container when to be put to use and to be situated within said closure means and said container and its filler opening when out of use.

And a further object is to provide a container for receiving and dispensing liquids wherein will be incorporated various improved features and characteristics of construction novel both as individual entities of the container and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

Figure 4:
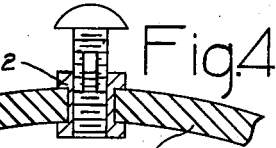
Figures 2, 3:
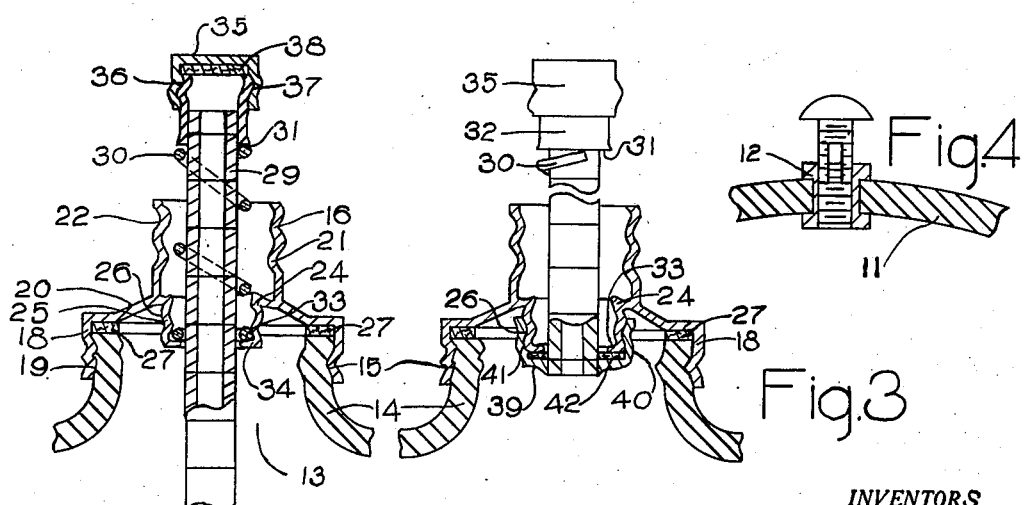

In the accompanying drawing forming a part of this specification,

Fig. 1 is a vertical, central sectional view of a container for receiving and dispensing liquids made according to the invention, said view disclosing a closure means, including a closure body and a closure member, for a filler opening of the container as when applied to said filler opening, and a pouring spout or nozzle for said container situated within the closure means and the container and its filler opening, beneath said closure member, as when out of use; and the view also disclosing an air vent device for the container, as when said air vent device is in closed position;

Fig. 2 is an enlarged fragmentary sectional view disclosing the container as when the closure member is removed from the closure body of the closure means and an end portion of the pouring spout or nozzle is protruding from said closure body to be accessible at the outer side of said container;

Fig. 3 is an enlarged fragmentary sectional view disclosing the container as when the closure member is removed from the closure body of the closure means and the pouring spout or nozzle is assembled with said container in pouring relation thereto at the outer side of the container; and Fig. 4 is a detail sectional view of the air vent device of Fig. 1, as when said air vent device is in open position.

With respect to the drawing and the numerals of reference thereon, 10 denotes side and lower closure walls of a container for receiving and dispensing liquids, and 11 indicates an upper closure wall of said container. The upper wall 11 of the container includes an ordinary or preferred air vent device 12 adapted to be in closed position as in Fig. 1, or in open position as in Fig. 4. Said upper wall 11 also includes an ordinary or preferred filler opening 13 defined by an upstanding neck 14 having an external thread 15.

A closure means for the filler opening 13 of the container is composed of a closure body 16 constituted as an adapter, and a closure member 17 for said closure body or adapter. More explicitly, the closure body or adapter 16 of the closure means includes an annular portion 18 internally threaded, as at 19, to be removably fitted upon the external thread 15 of the neck 14 providing the filler opening 13 of the container. The annular portion 18 of the closure body or adapter 16 integrally supports a conical portion 20 of said closure body or adapter which merges into a second annular portion 21, of smaller diameter than the annular portion 18 and concentric therewith, and said second annular portion 21 is externally threaded, as at 22. The closure member 17 includes a skirt which is internally threaded, as at 23, to be removably fitted upon the external thread 22 of the annular portion 21. Said closure body or adapter 16 also includes an integral annular flange 24 which extends inwardly from the conical portion 20 and the annular portion 21 substantially at the location where said conical portion 20 and annular portion 21 meet, and the inner margin or circumference of the annular flange 24 integrally supports a third annular portion 25 of the closure body or adapter 16 which is concentric with the annular portion 18 and 21 and is at the side of said annular flange 24 adjacent said annular portion 18 and opposite said annular portion 21. The annular portion 25 is externally threaded, as at 26, for a purpose to be set forth. As disclosed, the annular portion 25 is of considerably smaller diameter than is the annular portion 18, and the outer or lower end of said annular portion 25 terminates within the confines of said annular portion 18.

An annular gasket or washer 27 is adapted to provide a seal at the outer end of the neck 14 surrounding the filler opening 13 when the closure body or adapter 16 is turned home on said neck, and a circular gasket or washer 28 is adapted to provide a seal at the outer end of the annular portion 21 when the closure member 17 is turned home. As shown, the annular gasket or washer 27 is incorporated within the closure body or adapter 16, and the circular gasket or washer 28 is incorporated within the closure member 17.

The closure means for the filler opening of the container, consisting of the closure body or adapter 16 and the closure member 17 of general construction as hereinbefore set forth, is adapted to serve or function as a retaining means for a pouring spout or nozzle, represented generally at 29, of said container, and said pouring spout or nozzle is adapted to be assembled with said closure body or adapter of the closure means in pouring relation to the container at the outer side thereof when to be put to use and to be situated within said closure means and said container and its filler opening when out of use. More explicitly, the pouring spout or nozzle 29 is as illustrated a hollow elongated tube or pipe. Said hollow elongated tube or pipe constituting the pouring spout or nozzle is flexible in the disclosure as made, although in some instances said pouring spout or nozzle could be of rigid structure. The tube or pipe which comprises the pouring spout or nozzle is freely movable or slidable longitudinally in and through the annular portions 25 and 21 of the closure body or adapter 16 of the closure means for the container, and, desirably, said portion 25 will or may have internal diameter but slightly greater than the external diameter of the pouring spout, nozzle, tube or pipe 29, so that, in effect, the annular portion 25 will provide a guide way loosely disposed about said pouring spout or nozzle for directing it in its longitudinal sliding movement.

An expansion coil spring 30 upon the outlet or upper end portion of the tube or pipe 29 is for the purpose of urging said tube or pipe from its position as in Fig. 1 to its position as in Fig. 2 when the closure member 17 of the closure means for the filler opening 13 is removed from the closure body or adapter 16. That is, the coil spring 30 is adapted to urge the outlet or upper end portion of the pouring spout or nozzle 29 outwardly or upwardly upon removal of the closure member 17 to thus cause said pouring spout or nozzle to protrude from the closure body or adapter 16 of the closure means for said filler opening of the container and be accessible at the outer side of said container. As disclosed, said coil spring 30 is compressed between an annular shoulder 31, provided by a short tube or collar 32 rigidly fixed upon and about the outlet or upper end of the tube or pipe 29, and an annular shoulder 33, provided by an integral, inwardly extending, annular flange 34 upon the outer or lower end of the annular portion 25 of the closure body or adapter 16, when the closure member 17 is applied to the closure body or adapter 16 as in Fig. 1.

A closure cap 35 for the outlet or upper end of the pouring spout, nozzle, tube or pipe 29 includes a skirt which is internally threaded, as at 36, to be removably fitted upon an external thread 37 upon the short tube or collar 32. A circular gasket or washer 38, incorporated within the closure cap 35, is adapted to provide a seal at the outlet or upper end of said pouring spout, nozzle, tube, or pipe 29 when said closure cap is turned home.

An outwardly extending, annular flange 39 rigidly fixed to the pouring spout or nozzle 29 in surrounding relation to the inlet or lower end of said pouring spout or nozzle integrally supports an annular element 40 which is in spaced, concentric, surrounding relation to the pouring spout or nozzle and extends a short distance along the length of said spout or nozzle in direction toward its outlet or upper end. Said annular element 40 includes an internal thread 41 adapted to be removably fitted upon the external thread 26 on the annular portion 25 of the closure body or adapter 16 of the closure means for the filler opening 13 of the container.

An annular gasket or washer 42, seated against the annular flange 39 within the annular element 40, is adapted to provide a seal between the inlet or lower end portion of the pouring spout or nozzle and the outer or lower end of the annular portion 25 of the closure body or adapter 16 when the internal thread 41 on said annular member 40 is turned home upon the external thread 26 on said annular portion 25. That is, the annular gasket or washer 42 is adapted to provide a seal between the inlet or lower end portion of the pouring spout or nozzle 29 and the closure means for the filler opening of the container when said pouring spout or nozzle is turned home upon the annular portion 25 of the closure body or adapter 16 of said closure means.

In Fig. 1 of the drawing, the pouring spout or nozzle 29 is disclosed as when positioned within the container and its filler opening 13, as well as within the closure body or adapter 16 of the closure means for said filler opening, beneath the closure member 17 of said closure means. The coil spring 30 upon the outlet or upper end portion of said pouring spout or nozzle is compressed between the annular shoulders 31 and 33 to have potential tending to urge the pouring spout or nozzle outwardly of the container, and the closure member 17, threaded upon the annular portion 21 of the closure body or adapter 16, itself threaded upon the neck 14 of the container, is in engagement with the closure cap 35 upon the pouring spout or nozzle 29 to retain said pouring spout or nozzle in the position shown against resilient tendency of said coil spring 30 to urge the pouring spout or nozzle outwardly.

When said pouring spout or nozzle is to be applied to use to dispense liquid from the container, the closure member 17 is removed, or unscrewed, from the closure body or adapter 16, while said closure body or adapter is left threaded upon the neck 14 surrounding the filler opening 13 of the container. The coil spring 30 will act to move the pouring spout or nozzle outwardly of the closure body or adapter 16, as well as outwardly of the container, upon removal of said closure member 17, as said pouring spout or nozzle is disclosed in Fig. 2, to position where the outlet or upper end portion of the pouring spout or nozzle will be accessible.

To make the pouring spout or nozzle 29 ready for the accomplishment of a pouring operation, after said spout or nozzle has been moved to the position as in Fig. 2, the outlet or upper end portion of the pouring spout or nozzle is manually grasped and moved or slid longitudinally outwardly or upwardly through the annular portions 25 and 21 of the closure body or adapter 16 until the adjacent or upper end of the annular element 40 upon the inlet or lower end of said pouring spout or nozzle has reached the elevation of the outer or lower end of said annular portion 25, and then said pouring spout or nozzle is rotated in direction to cause the internal thread 41 on said annular element 40 to be turned home upon the external thread 26 on the annular portion 25, as disclosed in Fig. 3.

When it is desired to return the pouring spout or nozzle 29 to its position as in Fig. 1, at completion of a pouring operation, said pouring spout or nozzle is rotated in reverse direction until the annular element 40 is released from the annular portion 25. Thereafter, the pouring spout or nozzle is moved or slid longitudinally inwardly or downwardly through said annular portions 25 and 21 of said closure body or adapter 16, back to position as in Fig. 2, and thence said pouring spout or nozzle is moved or slid to the position as in Fig. 1, against the resilient action of the coil spring 30. The pouring spout or nozzle readily and easily can be moved or slid from its position as in Fig. 2 to its position as in Fig. 1, first by linear movement of the closure member 17, while against the closure cap 35 upon the outlet or upper end of said pouring spout or nozzle, to cause the pouring spout or nozzle to be pushed inwardly or downwardly until the outer or lower end of the skirt of said closure member 17 has reached the elevation of the outer or upper end of the annular portion 21 of the closure body or adapter 16, and then by rotating or turning movement of the closure member to cause the internal thread 23 on its skirt to be threaded onto the external thread 22 on said annular portion 21.

Of course, when the pouring spout or nozzle 29 is situated as in Fig. 1, out of use, the air vent device 12 will be closed, or moved to closed position, as in said Fig. 1, and when said pouring spout or nozzle is situated as in Fig. 3, ready to be employed to the accomplishment of a pouring operation, said air vent device will be open, or moved to open position, as in Fig. 4.

It will be evident that the closure means, consisting of the closure body or adapter 16 and the closure member 17, is adapted to be removed, or unscrewed, bodily, as a whole, from the neck 14 of the container when liquid is to be placed or poured into said container through the filler opening 13.

What is claimed is:

1. In a container for receiving and dispensing liquids, a pouring spout for said container, a tubular retaining member in which said pouring spout is longitudinally movable to be capable selectively of being situated in pouring relation to the container at the outer side thereof when to be put to use and within said container and retaining member when out of use, said tubular retaining member including an externally threaded portion, an annular element upon and in surrounding relation to the pouring spout and including an internally threaded portion adapted to be removably engaged with the externally threaded portion of said tubular retaining member to detachably secure the pouring spout and the tubular retaining member to each other, and a closure member for said tubular retaining member adapted to be removably secured upon the container in covering relation to said pouring spout and retaining member.

2. The combination as specified in claim 1, and means constituted as a coil spring under compression resiliently urging said pouring spout when in said container and retaining member outwardly of the container against said closure member.

3. In a container for receiving and dispensing liquids and including a filler opening, a pouring spout for said container adapted to be assembled with the container in pouring relation thereto at the outer side of the container when to be put to use and to be situated within the container and its filler opening when out of use, a closure means for said filler opening consisting of a closure body adapted to be removably threaded upon said container and a closure member removably threaded upon said closure body, said closure body including an annular member having an externally threaded portion, and an annular element upon said pouring spout having an internally threaded portion adapted to be removably engaged with the externally threaded portion of said annular member to detachably secure the annular member and the annular element to each other.

4. In a container for receiving and dispensing liquids and including a filler opening, a pouring spout for said container, a closure means for said filler opening including a closure body adapted to be detachably threaded upon said container and a closure member detachably threaded upon said closure body, the closure body including an annular member thereof in which said pouring spout is longitudinally movable to be capable selectively of being situated in pouring relation to the container at the outer side thereof when to be put to use and within said closure body and said container and its filler opening adjacent said closure member when out of use, an externally threaded portion upon said annular member, and an annular element upon said pouring spout having an internally threaded portion thereof adapted to be removably engaged with the externally threaded portion of said annular member to detachably secure the annular member and the annular element to each other.

5. The combination as specified in claim 4, and means constituted as a coil spring under compression resiliently urging said pouring spout when within said closure body and said container and its filler opening outwardly of the container against said closure member.

6. In a container for receiving and dispensing liquids, a pouring spout for said container, a tubular retaining member in which said pouring spout is longitudinally movable to be capable selectively of being situated in pouring relation to the container at the outer side thereof when to be put to use and within said container and retaining member when out of use, an annular element upon and in surrounding relation to a lower portion of the pouring spout, complemental means upon said tubular retaining member and said pouring spout for detachably securing the tubular retaining member and the pouring spout to each other when said pouring spout is to be put to use, means adapted to constitute a seal between said tubular retaining member and said pouring spout when the retaining member and pouring spout are secured to each other, and a closure member for said tubular retaining member adapted to be removably secured upon the container in covering relation to said pouring spout and retaining member.

7. In a container for receiving and dispensing liquids, a pouring spout for said container, a tubular retaining member in which said pouring spout is longitudinally movable to be capable selectively of being situated in pouring relation to the container at the outer side thereof when to be put to use and within said container and retaining member when out of use, an annular element upon and in surrounding relation to a lower portion of the pouring spout, complemental means upon said tubular retaining member and said pouring spout for detachably securing the tubular retaining member and the pouring spout to each other when said pouring spout is to be put to use, means seated between said annular element and an end portion of said tubular retaining member adapted to constitute a seal between the tubular retaining member and the pouring spout when said retaining member and said pouring spout are secured to each other, and a closure member for said tubular retaining member adapted to be removably secured in covering relation to said pouring spout and retaining member.

8. In a container for receiving and dispensing liquids, a pouring spout for said container, a tubular retaining member in which said pouring spout is longitudinally movable to be capable selectively of being situated in pouring relation to the container at the outer side thereof when to be put to use and within said container and retaining member when out of use, said tubular retaining member including an externally threaded portion, an annular element upon and in surrounding relation to the pouring spout and including an internally threaded portion adapted to be removably engaged with the externally threaded portion of said tubular retaining member to detachably secure the pouring spout and the tubular retaining member to each other, when said pouring spout is to be put to use, means adapted to constitute a seal between said tubular retaining member and said pouring spout when the retaining member and pouring spout are secured to each other, and a closure member for said tubular retaining member adapted to be removably secured in covering relation to said pouring spout and retaining member.

9. In a container for receiving and dispensing liquids, a pouring spout for said container, a tubular retaining member in which said pouring spout is longitudinally movable to be capable selectively of being situated in pouring relation to the container at the outer side thereof when to be put to use and within said container and retaining member when out of use, said tubular retaining member including an externally threaded portion, an annular element upon and in surrounding relation to the pouring spout and including an internally threaded portion adapted to be removably engaged with the externally threaded portion of said tubular retaining member to detachably secure the pouring spout and the tubular retaining member to each other when said pouring spout is to be put to use, means seated between said annular element and the end portion of said tubular retaining member adjacent its externally threaded portion adapted to constitute a seal between the tubular retaining member and the pouring spout when said internally threaded portion of the annular element is engaged with said externally threaded portion of the tubular retaining member, and a closure member for said tubular retaining member adapted to be removably secured upon the container in covering relation to said pouring spout and retaining member.

10. In a container for receiving and dispensing liquids and including a filler opening, a pouring spout for said container adapted to be assembled with the container in pouring relation thereto at the outer side of the container when to be put to use and to be situated within the container and its filler opening when out of use, a closure means for said filler opening consisting of a closure body adapted to be removably threaded upon said container and a closure member removably threaded upon said closure body, said closure body including an annular member, an annular element upon said pouring spout and in surrounding relation to the pouring spout, complemental means upon said annular member and said pouring spout for detachably securing the annular member and pouring spout to each other when said pouring spout is to be put to use, and means adapted to constitute a seal between said annular member and said annular element when the annular member and pouring spout are secured to each other.

11. In a container for receiving and dispensing liquids and including a filler opening, a pouring spout for said container adapted to be assembled with the container in pouring relation thereto at the outer side of the container when to be put to use and to be situated within the container and its filler opening when out of use, a closure means for said filler opening consisting of a closure body adapted to be removably threaded upon said container and a closure member removably threaded upon said closure body, said closure body including an annular member having an externally threaded portion, an annular element upon said pouring spout having an internally threaded portion adapted to be removably engaged with the externally threaded portion of said annular member to detachably secure the annular member and the annular element to each other when said pouring spout is to be put to use, and means seated between said annular element and the end portion of said annular member adjacent its externally threaded portion adapted to constitute a seal between the annular member and the pouring spout when said internally threaded portion of the annular element is engaged with said externally threaded portion of the annular member.

12. In a container for receiving and dispensing liquids and including a filler opening, a pouring spout for said container, a closure means for said filler opening including a closure body adapted to be detachably threaded upon said container and a closure member detachably threaded upon said closure body, the closure body including an annular member thereof in which said pouring spout is longitudinally movable to be capable selectively of being situated in pouring relation to the container at the outer side thereof when to be put to use and within said closure body and said container and its filler opening adjacent said closure member when out of use, an annular element upon said pouring spout and in surrounding relation to the pouring spout, complemental means upon said annular member and said pouring spout for detachably securing the annular member and pouring spout to each other when said pouring spout is to be put to use, and means adapted to constitute a seal between said annular member and said annular element when the annular member and pouring spout are secured to each other.

13. In a container for receiving and dispensing liquids and including a filler opening, a pouring spout for said container, a closure means for said filler opening including a closure body adapted to be detachably threaded upon said container and a closure member detachably threaded upon said closure body, the closure body including an annular member thereof in which said pouring spout is longitudinally movable to be capable selectively of being situated in pouring relation to the container at the outer side thereof when to be put to use and within said closure body and said container and its filler opening adjacent said closure member when out of use, an externally threaded portion upon said annular member, an annular element upon said pouring spout having an internally threaded portion thereof adapted to be removably engaged with the externally threaded portion of said annular member to detachably secure the annular member and the annular element to each other when said pouring spout is to be put to use, and means seated between said annular element and the end portion of said annular member adjacent its externally threaded portion adapted to constitute a seal between the annular member and the pouring spout when said internally threaded portion of the annular element is engaged with said externally threaded portion of the annular member, the internally threaded portion of said annular element being in surrounding relation to said seal.

HAROLD A. DAMKROGER.
JACOB F. NIGGELER.